United States Patent [19]

Melchior et al.

[11] 4,183,903
[45] Jan. 15, 1980

[54] METHOD OF REMOVING CARBON DIOXIDE FROM GASES UTILIZING AN ALKALINE ABSORPTION SOLUTION CONTAINING A CYCLIC UREA ANTI-FOAMING AGENT

[75] Inventors: Michael T. Melchior, Scotch Plains; George E. Milliman, Fanwood; Guido Sartori, Linden, all of N.J.

[73] Assignee: Exxon Research & Engineering Co., Florham Park, N.J.

[21] Appl. No.: 930,222

[22] Filed: Aug. 2, 1978

[51] Int. Cl.² ............................................. B01D 53/34
[52] U.S. Cl. .................................... 423/226; 423/228; 423/232; 252/358
[58] Field of Search ............................... 423/228–229, 423/226, 232; 252/358

[56] References Cited

U.S. PATENT DOCUMENTS

| 2,176,441 | 10/1939 | Ulrich et al. | 423/228 |
|---|---|---|---|
| 2,608,462 | 8/1952 | Frazier et al. | 423/228 |
| 2,674,619 | 4/1954 | Lundsted | 260/485 |
| 2,712,978 | 7/1955 | Blohm et al. | 423/228 |
| 2,946,652 | 7/1960 | Bloch | 423/228 |
| 3,071,433 | 1/1963 | Dunn | 423/224 |
| 3,275,403 | 9/1966 | Maylard | 423/229 |
| 3,361,783 | 1/1968 | Fink | 252/358 |
| 3,642,430 | 2/1972 | Benson | 423/223 |
| 3,848,057 | 11/1974 | Leder et al. | 423/223 |
| 3,862,243 | 1/1975 | Bellos | 423/210 X |
| 3,943,227 | 3/1976 | Schutze | 423/232 |
| 4,002,721 | 1/1977 | Cuffy et al. | 423/232 |
| 4,042,528 | 8/1977 | Abe | 252/358 |
| 4,094,957 | 6/1978 | Sartori et al. | 423/223 |
| 4,100,257 | 7/1978 | Sartori et al. | 423/226 |
| 4,101,633 | 7/1978 | Sartori et al. | 423/228 |
| 4,112,050 | 9/1978 | Sartori et al. | 423/223 |
| 4,112,051 | 9/1978 | Sartori et al. | 423/223 |
| 4,112,052 | 9/1978 | Sartori et al. | 423/228 |

FOREIGN PATENT DOCUMENTS 1121617 1/1962 Fed. Rep. of Germany.
357400 11/1961 Switzerland.

Primary Examiner—Earl C. Thomas
Attorney, Agent, or Firm—Albert P. Halluin

[57] ABSTRACT

Antifoaming agents for use in acid gas scrubbing processes comprising 1-secondary or 1-tertiary alkyl- or 1-cycloalkyl-hexahydro-2-pyrimidinones and 1-secondary or 1-tertiary alkyl- or 1-cycloaklyl-2-imidazolidinones are disclosed.

11 Claims, No Drawings

METHOD OF REMOVING CARBON DIOXIDE FROM GASES UTILIZING AN ALKALINE ABSORPTION SOLUTION CONTAINING A CYCLIC UREA ANTI-FOAMING AGENT

BACKGROUND OF THE INVENTION

1. Field of the Invention

The present invention pertains to novel antifoaming agents comprising 1-secondary or 1-tertiary alkyl- or 1-cycloalkyl-hexahydro-2-pyrimidinones and 1-secondary or 1-tertiary alkyl or 1-cycloalkyl-2-imidazolidinones.

2. Description of the Prior Art

Acid gas scrubbing processes are of considerable industrial importance. Most acid gas scrubbing processes involve contacting a gas stream with an aqueous alkaline solution and absorbing the acid gas, principally carbon dioxide and hydrogen sulfide, into the solution and regenerating the solution in a separate stage. The regenerated solution is then recycled to the absorption stage. One of the problems encountered in acid gas scrubbing processes is excess foaming, i.e., aqueous alkaline solutions have a natural inclination to foam, and the passing of a gas into a foamable solution is classic to the production of a foam. Consequently, resort to the use of antifoaming agents as additives to the aqueous acid gas scrubbing solutions is a common practice in the art.

There are many commercially available antifoaming agents. These antifoaming agents find a plurality of uses. However, the selection of an antifoaming agent in acid gas scrubbing processes is dependent upon several variables unique to acid gas scrubbing processes. The antifoaming agents of the present invention are particularly suited for acid gas scrubbing processes.

The following U.S. patents were considered in connection with the present invention:

| U.S. Pat. Nos. | |
|---|---|
| 2,176,441 | 3,848,057 |
| 2,608,462 | 3,862,243 |
| 2,674,619 | 3,943,227 |
| 2,712,978 | 4,002,721 |
| 2,946,652 | 4,042,528 |
| 3,071,433 | 4,094,957 |
| 3,275,403 | 4,100,257 |
| 3,642,430 | 4,101,633 |

None of these patents disclose, teach or suggest 1-substituted cyclic ureas (i.e., 1-substituted hexahydro-2-pyrimidinones and 1-substituted-2-imidazolidinones) and/or their use as antifoaming agents in acid gas scrubbing processes. Many of these patents teach acid gas scrubbing processes and the use of antifoaming agents in their respective processes. Of particular interest are U.S. Pat. Nos. 4,094,957; 4,100,257; and 4,101,633, in addition to U.S. Pat. Nos. 4,112,050; 4,112,051; and 4,112,052, the disclosures of which are incorporated herein by reference. These patents and patent applications teach and disclose the use of sterically hindered amines, alone, or in combination with other acid gas scrubbing compositions in acid gas scrubbing processes. These patents and patent applications point out that there are three principal types of acid gas processes, i.e., the aqueous amine process (amine and water constitute the acid gas scrubbing solution), the "hot potash" process (an inorganic alkaline material such as potassium carbonate activated by at least one amine) and the organic solvent process (an organic solvent such as sulfolane used in combination with an amine). Foaming problems are especially troublesome in the "hot potash" type processes such as described and claimed in U.S. Pat. No. 4,094,957 and U.S. Pat. No. 4,112,050.

The prior art has included disclosures of some cyclic ureas for applications in the textile and pharmaceutical industries. For example, German Pat. No. 1,121,617 discloses the reaction of urea with 1,3-propanediamines of the formula $R'—NH—CR_2—CR_2—CR_2NHR$, wherein $R'$ is alkyl-, cycloalkyl-, hydroxyalkyl-, aryl- or aralkyl radicals and R is the same as $R'$ or a hydrogen atom. This German patent does not specifically disclose the instantly claimed antifoaming agents or their use as antifoaming agents in acid gas scrubbing processes. Swiss Pat. No. 357,400 discloses the reaction of urea with N-substituted 1,3-propanediamines of the formula: $R—NH—CH_2—CH_2CH_2—NH_2$, wherein R is hydrogen or an aliphatic radical having 1–18 carbon atoms.

SUMMARY OF THE INVENTION

The present invention includes novel antifoaming agents which are "cyclic ureas" represented by the general formula:

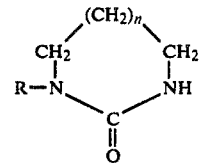

wherein R is a secondary or tertiary alkyl or substituted or unsubstituted cycloalkyl radical having from 4 to 20 carbon atoms and n is 0–2. Particularly preferred compounds are those wherein R is selected from the group consisting of sec. butyl, sec. pentyl-, t-butyl-, t-pentyl-, t-hexyl-, cyclopentyl-, cyclohexyl-, cycloheptyl-, and alkyl-substituted cyclohexyl- and cycloheptyl-radicals, wherein the substituted alkyl groups have 1–6 carbon atoms and n is preferably 1. An especially preferred antifoaming agent is the compound represented by the formula:

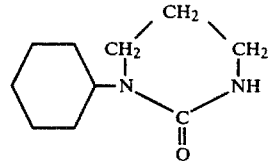

i.e., 1-cyclohexyl-hexahydro-2-pyrimidinone.

The antifoaming agents of the invention may be combined with alkaline materials normally used in acid gas scrubbing processes, e.g., alkali metal salts or alkali metal hydroxides and/or amines. Preferably the antifoaming agents will be used in combination with an alkali metal salt such as potassium carbonate and an amine activator. The amine activator may be 1,6-hexanediamine, piperidine or their derivatives (as disclosed in U.S. Pat. Nos. 3,637,345; 3,793,434; and 3,848,057, the disclosures of which are incorporated herein by reference), sterically hindered amines, i.e., amines wherein at least one secondary amino group is attached to either a secondary or tertiary carbon atom or a primary amino group is attached to a tertiary carbon atom, especially preferred, the sterically hindered aminoethers, aminoalcohols, di- and triamines such as disclosed in U.S. Pat. No. 4,094,957 and U.S. Pat. No. 4,112,050 and other amine activators, coactivators and mixtures thereof.

The amount of the antifoaming agent used in the acid gas scrubbing composition of the invention may vary, and the amount is not critical. Preferably, the antifoaming agent will be present in an amount ranging from about 1 to about 1000 parts per million (ppm), preferably from about 10 to about 50 ppm per weight of the total acid gas scrubbing solution.

The term "acid gas" includes $CO_2$ alone or in combination with $H_2S$, $SO_2$, $SO_3$, $CS_2$, HCN, COS and the oxides and sulfur derivatives of $C_1$ to $C_4$ hydrocarbons. The major constituents of the acid gas will be comprised of $CO_2$ and/or $H_2S$.

DESCRIPTION OF THE PREFERRED EMBODIMENTS

The absorbing solution containing the antifoaming agent of the invention will preferably be comprised of a major proportion of alkali metal salts and a minor proportion of the amine activator. The salt content of the acid gas scrubbing solution will be in the range from about 10 to 40 weight percent, preferably 20 to 30 weight percent. The content of the amine activator, preferably a sterically hindered amine, in the solution will be in the range from about 2 to about 20 weight percent, preferably 5 to about 15 weight percent and more preferably 5 to about 10 weight percent. As a preferred embodiment, the amine activator will be comprised of a sterically hindered amine which may be used alone or in combination with other amines such as diethanolamine and/or aminoacid cosolvents for the sterically hindered amines as disclosed and claimed in U.S. Pat. No. 4,094,957. The aminoacid cosolvent will include those aminoacids having 4 to 8 carbon atoms which increase the solubility of sterically hindered amines in alkaline aqueous conditions at elevated temperatures, e.g., N,N-dimethylglycine, 3-amino-3-methyl butyric acid, 2-amino-2-methyl-butyric acid, and pipecolinic acid. The preferred sterically hindered amines include: the cycloaliphatic diamines such as N-cyclohexyl-1,2-ethanediamine, N-cyclohexyl-1,3-propane-diamine, N-cyclohexyl-1,4-butanediamine and N-cyclohexyl-1,5-pentanediamine; the piperazines such as 2-methylpiperazine and 2,5-dimethylpiperazine and the diamine, $N_1$(1,1-dimethyl-2-hydroxyethyl)-2-methyl-1,2-propanediamine. The most preferred sterically hindered amines are N-cyclohexyl-1,3-propanediamine and N-cyclohexyl-1,4-butanediamine. The most preferred cosolvent is pipecolinic acid.

Other additives in addition to the antifoaming agent of the invention can be included in the acid gas scrubbing solution, e.g., antioxidants, corrosion inhibitors, etc. Also, the acid gas scrubbing solution may contain mixtures of amines, e.g., the sterically hindered amines may be used in combination with diethanolamine.

The contacting of the absorbent mixture containing the antifoaming agent of the invention and the acid gas may take place in any suitable contacting tower. In such processes, the gaseous mixture from which the acid gases are to be removed may be brought into intimate contact with the absorbing solution using conventional means, such as a tower packed with, for example, ceramic rings or with bubble cap plates or sieve plates, or a bubble reactor. The antifoaming agent may be fed into the absorber alone or with the absorbent mixture and recycled as such.

In a preferred mode of practicing the invention, the absorption step is conducted by feeding the gaseous mixture into the base of the tower while fresh absorbing solution is fed into the top. The gaseous mixture freed largely from acid gases emerges from the top. Preferably, the temperature of the absorbing solution during the absorption step is in the range from about 25° to about 200° C., and more preferably from 35° to about 150° C. Pressures may vary widely; acceptable pressures are between 5 and 2000 psia, preferably 100 to 1500 psia, and most preferably 200 to 1000 psia in the absorber. In the desorber the pressures will range from about 5 to 100 psia. The partial pressure of the acid gas, e.g., $CO_2$ in the feed mixture will preferably be in the range from about 0.1 to about 500 psia, and more preferably in the range from about 1 to about 400 psia. The contacting takes place under conditions such that the acid gas, e.g., $CO_2$, is absorbed by the solution. Generally, the countercurrent contacting to remove the acid gas will last for a period of from 0.1 to 60 minutes, preferably 1 to 5 minutes. During absorption the solution is preferably maintained in a single phase, e.g., by action of an aminoacid cosolvent in the event a relatively insoluble sterically hindered amine is used as the $K_2CO_3$ activator. The aminoacid cosolvent also aids in foam reduction.

The absorbing solution comprising the aqueous mixture containing the alkaline metal salt and preferably the sterically hindered amine and aminoacid which is saturated or partially saturated with gases, such as $CO_2$ and $H_2S$ may be regenerated so that it may be recycled back to the absorber. The regeneration should also take place in a single liquid phase. Therefore, the presence of an aminoacid cosolvent provides an advantage in this part of the overall acid gas scrubbing process. The regeneration or desorption is accomplished by conventional means, such as pressure reduction, which causes the acid gases to flash off or by passing the solution into a tower of similar construction to that used in the absorption step, at or near the top of the tower, and passing an inert gas such as air or nitrogen or preferably steam up the tower. The temperature of the solution during the regeneration step may be the same as used in the absorbing step, i.e., 25° to about 200° C. and preferably 35° to about 150° C. The absorbing solution, after being cleansed of at least a portion of the acid bodies, may be recycled back to the absorbing tower. Makeup absorbent may be added as needed. Single phase is maintained during desorption by controlling the acid gas, e.g., $CO_2$, level so that it does not fall into the region where two liquid phases form. This, of course, following the practice of the present invention is facilitated by the use of the aminoacid cosolvent in combination with the sterically hindered amine.

For example, during desorption, the $CO_2$-rich solution from the high pressure absorber is sent first to a flash chamber where steam and some $CO_2$ are flashed from solution at low pressure. The amount of $CO_2$ flashed off will in general be about 35 to 40% of the net $CO_2$ recovered in the flash and stripper. This is increased somewhat, e.g., to 40 to 50%, with the high desorption rate promoter system owing to a closer approach to equilibrium in the flash. Solution from the flash drum is then steam stripped in the packed or plate tower, stripping steam having been generated in the reboiler in the base of the stripper. Pressure in the flash drum and stripper is usually 16 to about 100 psia, preferably 16 to about 30 psia, and the temperature is in the range from about 25° to about 200° C., preferably 35° to about 150° C., and more preferably 100° to about 140° C. Stripper and flash temperatures will, of course, depend on stripper pressure, thus at about 16 to about 25 psia stripper pressures, the temperature will preferably be about 100° to about 140° C. during desorption. Single phase can be maintained during desorption by regulating the amount of acid gas, e.g., $CO_2$, recovered.

The cyclic urea antifoaming agents of the invention can be prepared synthetically or by an in situ reaction during the acid gas scrubbing process under the appropriate conditions as discussed below. The cyclic urea antifoaming agent is prepared synthetically by reacting urea with the appropriate diamine at elevated temperatures, e.g., 100° C. to about 250° C. The reaction may be conducted neat or in the presence of a solvent for the reactants, e.g., an alcohol. Alternatively, the cyclic ureas are prepared in situ in an acid gas scrubbing process wherein the acid gas contains both $H_2S$ and $CO_2$. For example, when N-cyclohexyl-1,3-propane-diamine is used as an activator for $K_2CO_3$ under absorption conditions in the presence of $H_2S$ and $CO_2$ (i.e., high temperatures and pressures) it forms 1-cyclohexyl-hexahydro-2-pyrimidinone.

The invention is illustrated further by the following examples which, however, are not to be taken as limiting in any respect. All parts and percentages, unless expressly stated to be otherwise, are by weight.

EXAMPLE 1

Preparation of 1-Cyclohexyl-Hexa-Hydro-2-Pyrimidinone

The reaction apparatus is a 500 ml flask, equipped with thermometer, reflux condenser and magnetic stirrer. The top of the reflux condenser is connected to a bubbler containing water. Before adding the reagents, the flask is weighed. Then 30 g of urea (0.5 mols) and 156 g of N-cyclohexyl-1,3-propanediamine (1 mol) are put into the flask, which is then slowly heated. Ammonia begins to evolve. Heating is continued until 18 g of ammonia have evolved. The reaction mixture is allowed to cool to room temperature. The solid which precipitates is separated by filtration on a Buchner funnel and dried in vacuo. The weight is 78 g and the melting point is 175° C. The raw reaction product is recrystallized from boiling ethanol. The melting point of the recrystallized product is 198° C. The nitrogen content is 15.25%, whereas the theoretical value is 15.37%. The structure of the product as confirmed by a combination of elemental analysis, $^{13}C$ NMR and $^{1}H$ NMR is determined as follows:

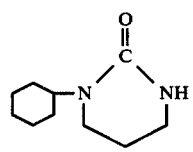

The structure of this compound has been corroborated by IR and VPO molecular weight measurements. The elemental analysis is as follows:

|  | Calc. For $C_{10}H_{18}N_2O$ | Found |
| --- | --- | --- |
| % C | 65.90 | 65.89 |
| % H | 9.95 | 9.70 |
| % N | 15.37 | 15.25 |
| Molecular weight | 182 | 175 (by VPO) |

Solubility - Soluble in ethanol, pyridine, sl. soluble in chloroform. Slightly soluble in hot $H_2O$, but does not hydrolyze.

In a similar manner N-cyclohexane-1,2-ethanediamine and N-cyclohexane-1,4-butanediamine are reacted with urea to form, respectively, compounds of the structural formulae:

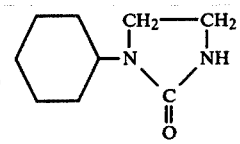 and

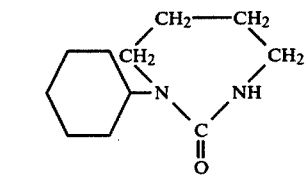

EXAMPLE 2

This example shows the defoaming effect of the cyclic ureas of the invention.

An add on test is simulated wherein a small amount of N-cyclohexyl-1,3-propane-diamine (CHPD) and cosolvent, pipecolinic acid are added to a diethanolamine (DEA) acid gas scrubbing solution. In one experiment there is no antifoaming agent present and in the other, one-half of the CHPD from the first experiment has been converted to the corresponding cyclic urea. The acid gas scrubbing solution is put into a cyclindrical graduated 4 liter jacketed gas trap apparatus. A circulating oil bath surrounds the cylinder to maintain the temperature of the unit at 80° C. A gas sparger is inserted through an adapter with a reflux condenser on the side arm to insure the integrity of the starting solution. The acid gas scrubbing solution put in the apparatus is then allowed to equilibrate at the 80° C. level. A calibrated flow (½ to 4 L/min) of $N_2$ gas is introduced into the solution and the foam is allowed to stabilize. The height of the foam is then measured from the base of the foam to the top. With this number recorded, the gas is then stopped abruptly and the foam allowed to settle and the time required is measured. The foam height can be plotted as a function of gas rate. The acid gas scrubbing solution (without the antifoaming agent) has the following composition:

| 31.5g. | diethanolamine (DEA) |
| --- | --- |
| 187.5g. | $K_2CO_3$ |
| 36.9g. | $H_3BO_3$ |
| 3.7g. | CHPD |
| 1.8g. | pipecolinic acid |
| 480.0g. | $H_2O$ |

The test solution containing the antifoaming agent of the invention has 1.85 g. of 1-cyclohexyl-hexahydro-2- pyrimidinone and 1.85 g. of CHPD. The remaining ingredients in the acid gas scrubbing solution are the same as above. The results of the tests using the above acid gas scrubbing solution are shown below.

TABLE

| Gas Rate/Liters/Min | Foam Height, ml | |
|---|---|---|
| | No Antifoaming Agent | Contains Antifoaming Agent of Invention |
| 0.5 | 10 | 10 |
| 1 | 100 | 10 |
| 2 | 350 | 10 |
| 3 | 500 | 20 |
| 4 | 700 | 20 |

The results in the Table show that the addition of the cyclic urea antifoaming agent of the invention in the acid gas scrubbing solution has a defoaming effect. This defoaming effect is not predictable from the structure of the compound.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

What is claimed is:

1. A process for the removal of $CO_2$ from a gaseous stream containing $CO_2$ which comprises contacting said gaseous stream (1) in an absorption step with an aqueous absorbing solution comprising an alkaline material selected from the group consisting of alkali metal salts, alkali metal hydroxides and amines and (2) in a desorption and regeneration step desorbing at least a portion of the absorbed $CO_2$ from said absorbing solution, the improvement which comprises including in said aqueous absorbing solution an antifoaming agent comprising a cyclic urea represented by the general formula:

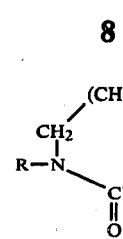

wherein R is a secondary or tertiary alkyl or cycloalkyl or substituted cycloalkyl radical having from 4-20 carbon atoms and n is 0-2.

2. The process of claim 1 wherein R is selected from the group consisting of sec. butyl-, sec. pentyl-, t-butyl-, t-pentyl-, t-hexyl-, cyclopentyl-, cyclohexyl-, cycloheptyl-, and alkyl-substituted cyclohexyl and cycloheptyl radicals.

3. The process of claim 1 wherein n is 1.

4. The process of claim 1 wherein R is cyclohexyl.

5. The process of claim 1 wherein the antifoaming agent is represented by the formula:

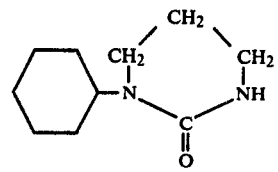

6. The process of claim 1 wherein the alkaline material is comprised of potassium carbonate and an amine activator.

7. The process of claim 6 wherein the amine activator is a sterically hindered amine.

8. The process of claim 7 wherein the sterically hindered amine is a diamine.

9. The process of claim 8 wherein the diamine is selected from the group consisting of N-cyclohexyl-1,2-ethanediamine, N-cyclohexyl-1,3-propanediamine, N-cyclohexyl-1,4-butanediamine, and N-cyclohexyl-1,5-pentanediamine.

10. The process of claim 8 wherein the diamine is N-cyclohexyl-1,3-propanediamine and the absorbing solution additionally contains an aminoacid cosolvent containing 4-8 carbon atoms.

11. The process of claim 10 wherein the cosolvent is pipecolinic acid.

* * * * *